US007356222B2

United States Patent
Hashizume et al.

(10) Patent No.: US 7,356,222 B2
(45) Date of Patent: Apr. 8, 2008

(54) WAVELENGTH SELECTIVE OPTICAL DEVICE AND METHOD OF TUNING A WAVELENGTH CHARACTERISTIC OF THE SAME

(75) Inventors: Hideki Hashizume, Somerset, NJ (US); Haiguang Lu, Somerset, NJ (US)

(73) Assignee: Nippon Sheet Glass Co., Ltd., Osaka (JP)

( * ) Notice: Subject to any disclaimer, the term of this patent is extended or adjusted under 35 U.S.C. 154(b) by 125 days.

(21) Appl. No.: 10/702,043

(22) Filed: Nov. 6, 2003

(65) Prior Publication Data

US 2005/0100276 A1    May 12, 2005

(51) Int. Cl.
    *G02B 6/26* (2006.01)
(52) U.S. Cl. .............................. 385/34; 385/31; 385/24; 385/11; 385/14; 385/20; 385/16; 385/25; 385/26; 385/27; 385/28; 385/29; 385/30; 359/131
(58) Field of Classification Search .................. 385/11, 385/14, 16, 28–34
    See application file for complete search history.

(56) References Cited

U.S. PATENT DOCUMENTS

| | | | |
|---|---|---|---|
| 5,555,330 A | 9/1996 | Pan et al. | |
| 5,799,121 A | 8/1998 | Duck et al. | |
| 5,943,149 A * | 8/1999 | Cearns et al. | ............... 398/79 |
| 6,023,542 A | 2/2000 | Pan et al. | |
| 6,084,994 A * | 7/2000 | Li et al. | ...................... 385/31 |
| 6,597,837 B2 | 7/2003 | Xiaofan | |
| 6,760,085 B2 | 7/2004 | Sato et al. | |
| 2002/0140929 A1* | 10/2002 | Kittaka et al. | ............ 356/124 |
| 2003/0026540 A1 | 2/2003 | Fukuzawa et al. | |
| 2003/0035621 A1 | 2/2003 | Kittaka et al. | |

* cited by examiner

*Primary Examiner*—Frank G. Font
*Assistant Examiner*—Erin D Chiem
(74) *Attorney, Agent, or Firm*—Whitham Curtis Christofferson & Cook, P.C.

(57) ABSTRACT

The invention provides a wavelength selective optical device in which a light emitted from an end surface of a first optical fiber that propagates optical signals with a plurality of multiplexed wavelengths is incident on a first end surface of a first graded index rod lens, then a parallel light beam emitted from a second end surface of the first graded index rod lens is incident on an optical filter arranged to face to the second end surface of the first graded index rod lens, and then a light reflected by the optical filter is incident again on the second end surface of the first graded index rod lens so as to couple to a second optical fiber arranged on a first end surface side of the first graded index rod lens, wherein a refractive index distribution constant of the first graded index rod lens is set such that a center wavelength of the light reflected by the optical filter is positioned within a desired range.

19 Claims, 3 Drawing Sheets

WAVELENGTH SELECTIVE OPTICAL DEVICE AND METHOD OF TUNING A WAVELENGTH CHARACTERISTIC OF THE SAME

BACKGROUND OF THE INVENTION

1. Field of the Invention

The present invention relates to a wavelength selective optical device used in the optical communication field or the like. More particularly, the present invention relates to a wavelength selective optical device employing an optical filter as a wavelength selecting element, and a method of tuning the same.

2. Related Art

In the optical communication field or the like, there are known various devices utilizing the nature of the wavelength of light for controlling transmission and transferring of information. For example, the wavelength division multiplexing large-capacity optical communication (Dense Wavelength Division Multiplexing (DWDM), Coarse Wavelength Division Multiplexing (CWDM), or the like) in which multi-wavelength laser beams with a narrow line width are superposed at a high density and then input/output into/from one optical fiber is now spreading. In this wavelength division multiplexing optical communication, a desired wavelength signal (channel) must be demultiplexed from the multiplexed light signals or conversely multiplexed to such multiplexed light signals to bundle them into one optical fiber.

The center wavelength and the wavelength width of each channel are normalized respectively. The optical coupler constituting the system must select only a desired channel signal and pick up it at a low loss, and must prevent crosstalks of unselected signals between its adjacent channels and its outside channels.

In the high-density wavelength division multiplexing system such as DWDM, CWDM, or the like utilizing the dielectric multilayer optical filter as the wavelength isolating element, it is normal that, in order to enhance the isolation between the picked-up signals and reduce the crosstalk between them, the light transmitted through the filter is used to select the signal and also the reflected light including the residual reflection is treated as the express signal for the optical coupler on the subsequent stage.

As the optical filter, various optical filters such as a bandpass filter (BPF) for passing only a predetermined wavelength band, a shortwave pass filter (SWPF) for passing only a shorter wavelength side than the predetermined wavelength, a longwave pass filter (LWPF) for passing only a longer wavelength side than the predetermined wavelength, etc. are present in compliance with the applications. Normally, BPF is used in DWDM or CWDM.

Here, of importance are (1) both-side wavelength edges of the pass wavelength band of BPF are positioned on the outside of the wavelengths on both ends of the selected channel, and a signal loss in all wavelength bands in the channel is small, and (2) both-side wavelength edges are positioned such that the pass wavelength band of BPF does not contain wavelength bands of adjacent unselected channels, and crosstalks of unselected channels are suppressed sufficiently small.

Characteristics of BPF such as the wavelength bandwidth, the crosstalk blocking amount (isolation), etc. are decided substantially by the filter design. However, values of the filter such as the edge wavelength, the center wavelength, etc. are varied every lot at the time of filter production. Also, these values are varied to some extent in a sheet of glass substrate. For this reason, an amount of wavelength shift must be tuned (the wavelength tuning must be applied) consciously at the time of assembling the optical coupler to make the optical coupler conform to the standard of the optical system (component) using this optical coupler as the constituent element.

For example, in the case of 100 GHz DWDM system, a channel interval is about 0.8 nm and a channel bandwidth is about 0.22 nm. Therefore, it is possible that the performance characteristic of the component is largely affected even by a small wavelength deviation such as about 0.1 nm.

FIG. 1 shows a concept to tune the center wavelength of BPF. Assume that, when an incident light is incident on the BPF manufactured based on predetermined design values in compliance with a predetermined method, the passing characteristic of BPF, illustrated by light intensity P, is given as indicated by a broken line. This indicates that the center wavelength is deviated from a center wavelength $\lambda p$ of the specified channel (x) to the longer wavelength side and that a loss is increased on the shorter wavelength side than the channel bandwidth of the channel (x) to be selected. Also, the crosstalk in the unselected channel (x+1) on the longer wavelength side is increased. Therefore, the wavelength tuning must be applied to this characteristic as indicated by a solid line by any method.

Meanwhile, in the dielectric multilayer optical filter having the wavelength selectivity, when an incident angle of an incident light is changed, the wavelength edge is changed, or the center wavelength of the pass band together with the wavelength edge, if the filter is BPF, is changed. Normally the center wavelength is shifted to the shorter wavelength side by the oblique incidence in contrast to the vertical incidence. Consequently, it is feasible to execute the above wavelength tuning by utilizing this phenomenon.

FIG. 2 is a sectional view showing a basic structure of the wavelength division multiplexing optical coupler using a graded index rod lens. This optical coupler is assembled by optically tuning/fixing a subassembly, which is constructed by pasting an optical filter chip 40 onto a lens surface 33 of a dual fiber collimator 20, and a single fiber collimator 110. This dual fiber collimator 20 consists of a dual optical fiber pigtail 21 and a graded index rod lens 31. This single fiber collimator 10 consists of a single optical fiber pigtail 22 (dual optical fiber pigtail may also be employed) and a graded index rod lens 32.

An emitted light from one optical fiber 23 is incident on one end surface of the graded index rod lens 31. Assume that a lens length of the rod lens is a 0.25 pitch (¼ of a ray sinusoidal wave path period (pitch) peculiar to the graded index rod lens), an emitted light from the rod lens 31 is collimated into a parallel light beam. Then, a light contained in this parallel light beam in a predetermined wavelength range is reflected by the optical filter 40, then is converged again by the rod lens 31, and then is coupled to another optical fiber 24.

Also, a light other than lights in a light reflecting wavelength range is transmitted through the optical filter 40, then is converged by the rod lens 32 of the single fiber collimator 10, and then is coupled to the optical fiber 25. The signal light is wavelength-separated via such optical paths to reflect the optical characteristics of the filter.

As the prior art associated with the wavelength tuning of the filter, in U.S. Pat. No. 5,799,121, for example, the technology of changing the incident angle of the light into the optical filter by changing an alignment interval of two optical fibers to tune the center wavelength is set forth. In other words, an incident position of the light into the rod lens 31 is changed by changing a distance (an offset amount of the optical fiber, see FIG. 2) d between an optical axis of the pigtail 21 and optical axes of the optical fibers 23, 24, and thus the incident angle (φ) into the optical filter 40 is changed. When an optical fiber interval 2d (normally two optical fibers 23, 24 are arranged at an equal distance from the optical axis of the rod lens 31) is increased, the center wavelength of the selected signal is shifted to the shorter wavelength side.

Similarly, in U.S. Pat. No. 6,084,994, a mode of so-called dual optical fiber pigtail is constructed by fixing two optical fibers in the holder at a predetermined interval to actually suit the production of the optical coupler. Since the incident angle of the light into the optical filter can be changed by changing the interval between the optical axes of the optical fibers by exchanging the holder, it is possible to tune the center wavelength.

In the above method of tuning the selected center wavelength by adjusting the core interval of two optical fibers, there existed problems described in the following.

A core interval of two optical fibers becomes minimum when two optical fibers are tightly contacted to each other in parallel. A lower limit value of the core interval is defined by the cladding diameter (normally 125 μm) of the optical fiber. Since a finite effective diameter (a diameter which functions as the lens) exists in the rod lens, an upper limit value of the core interval is restricted by this diameter. Therefore, it is impossible to tune the selected center wavelength over the sufficient range.

Also, it is normal that the above holder is employed as the practical optical fiber fixing method. Normally the capillary in which through holes, through which the optical fiber is inserted respectively, are opened along the axis of the cylindrical member is employed as this holder. However, since an interval between the throughholes is small particularly near the above lower limit value of the core interval, it is difficult to open two through holes while maintaining the core interval at a desired value.

SUMMARY OF THE INVENTION

The present invention has been made to overcome such problems, and it is an object of the present invention to provide a wavelength selective optical device such as a wavelength division multiplexing optical coupler capable of carrying out a wavelength tuning with high precision without constraints on a cladding diameter of an optical fiber and an effective diameter of a rod lens.

A wavelength selective optical device of the present invention is applied to the optical coupler having a following configuration. The divergent light that propagates optical signals having a plurality of multiplexed wavelengths is incident on a first end surface of a first graded index rod lens, and then a parallel light beam being picked up from a second end surface of the first graded index rod lens is incident on an optical filter being arranged to face to the second end surface of the first graded index rod lens.

Then, a light being emitted from the first graded index rod lens and then reflected or transmitted by the optical filter is incident again on the second end surface of the first graded index rod lens.

It is preferable that the divergent light emitted from an end surface of a first optical fiber is incident on the first end surface of the first graded index lens. The light reflected by the optical filter may be coupled to a second optical filter though the rod lens.

In the wavelength selective optical device having the above configuration, a refractive index distribution constant of the first graded index rod lens is set in such a manner that a representative wavelength of a wavelength band of the light being reflected or transmitted by the optical filter is positioned within a desired range.

A refractive index profile N(r) of the graded index rod lens in the radius (r) direction can be approximated by the following formula:

$$N(r) = No\{1 - ((\sqrt{A})^2/2)r^2\}$$

where $\sqrt{A}$ is a refractive index distribution constant. Although the core interval of the optical fiber is still fixed, an angle of an emitted light from the rod lens, i.e., an angle of the incident light incident on the optical filter, can be changed by changing $\sqrt{A}$. Therefore, adjustment of changing the core interval of two optical fibers can be eliminated, and thus there is no necessity for preparing a number of capillaries having different through-hole intervals to change the core interval. In other words, the limitation imposed by the core interval can be overcome and therefore the wavelength selective optical device in which the center wavelength is tuned precisely can be provided readily.

Also, it is preferable that a light being passed through the optical filter should be incident on a first end surface of a second graded index rod lens being arranged such that the first end surface of the second graded index rod lens is faced to the optical filter, and a light being emitted from a second end surface opposed should be coupled to a third optical fiber.

If the reflect wavelength band is tuned precisely as described above, the pass wavelength band is similarly tuned. As a result, the wavelength selective optical device utilizing the reflected light and the transmitted light can be provided readily.

Also, it is preferable that the above optical filter should be formed directly on the second end surface of the first graded index rod lens. If the dielectric multi-layered film constituting the optical filter is forming simultaneously and directly on a number of rod lenses each having the different $\sqrt{A}$, the wavelength selective optical devices having various center wavelengths can be provided readily.

Alternately, it is preferable that a cylindrical member having an inner diameter through which the first graded index rod lens can be slid without clearance should be prepared, then an optical filter chip in which the optical filter is provided should be pasted to one end portion of the cylindrical member, and then the first graded index rod lens should be inserted from the other end portion of the cylindrical member.

According to this configuration, if a number of rod lenses each having the different $\sqrt{A}$ and the identical outer diameter are exchanged, the wavelength selective optical device having the desired center wavelength can be provided readily.

In other words, it is preferable that the first graded index rod lens should be selected among a plurality of graded index rod lens groups having various different refractive index distribution constants such that the center wavelength of the transmitted light from the optical filter or the reflected light by the optical filter is positioned within a desired range.

Upon assembling the wavelength selective optical device of the present invention, a light in a wavelength range that an optical filter separates (namely reflects) is incident on the rod lens from one optical fiber of the above dual optical fiber pigtail, and then a light being reflected by the optical fiber is coupled to other optical fiber by the rod lens. Then, relative positions of the rod lens and the dual optical fiber pigtail are moved and fixed such that an intensity of the coupled light is maximized or exceeds a predetermined value. Then, a representative value, e.g., a center value, of the separated wavelength band of the wavelength selective optical device is tuned within a predetermined range by exchanging the rod lens being incorporated for the first time for another rod lens having a different refractive index distribution constant.

If such wavelength characteristic tuning method is adopted, the wavelength selecting characteristic of the wavelength selective optical device can be tuned to a predetermined value without change of the interval between the optical fibers.

According to the present invention, even though an optical fiber whose center wavelength is deviated from a target center wavelength is manufactured, the optical fiber that is able to operate properly without correction of a core interval of two optical fibers can be manufactured. As a result, yield of an assembling production including the production step of the optical filter can be improved largely.

Incidentally, the optical filter of the invention is not limited to a band pass filter for a specific wavelength band. Other optical filters defining various wavelength ranges such as shortwave pass filters (SWPF), longwave pass filters and the like are also applicable.

BRIEF DESCRIPTION OF THE DRAWINGS

FIGS. 3A and 3B are schematic sectional views showing examples of wavelength division multiplexing optical couplers of the present invention, wherein FIG. 3A shows the case where a refractive index distribution constant ($\sqrt{A}$) of the graded index rod lens is small, and FIG. 3B shows the case where the same is large.

DETAILED DESCRIPTION OF THE PREFERRED EMBODIMENTS

Figure 1:
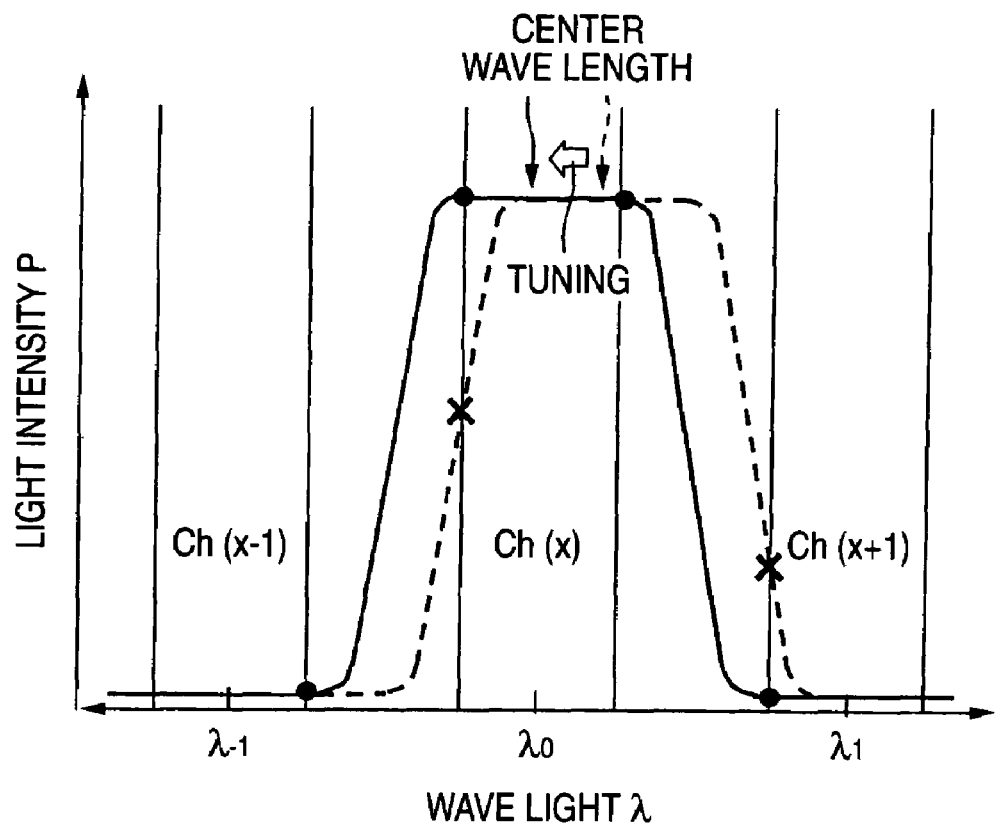
FIG. 1 is a conceptual view showing a pass band spectrum of an optical filter (BPF) and its center wavelength tuning.
Figure 2:
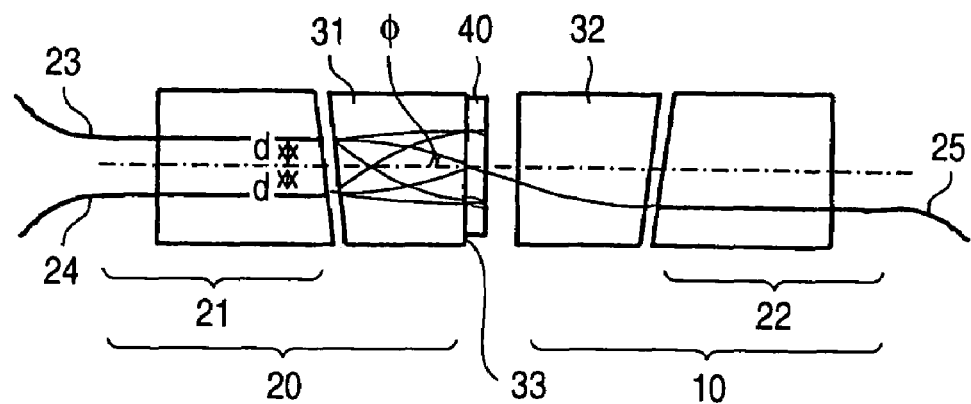
FIG. 2 is a schematic sectional view showing a wavelength division multiplexing optical coupler using a graded index rod lens.

Suppose that a refractive index profile N(r) of the graded index rod lens in a radius r direction can be represented by the formula:

$$N(r)=No\{1-((\sqrt{A})^2/2)r^2\}$$

where No is a refractive index of the rod lens on the center axis, and $\sqrt{A}$ is a refractive index distribution constant. When the rod lens a lens length of which is equal to a 0.25 pitch (¼ period of the ray sinusoidal wave path period) is employed, a relationship between a position r1 of an incident light incident vertically on one end surface of the rod lens and an angle θ2 (unit: radian) of an emitted light emitted from the other end of the rod lens is represented by the following formula:

$$\theta 2=-No\sqrt{A}\cdot r1$$

Therefore, the angle θ2 is in proportion to $\sqrt{A}$ when the position r1 of the incident light is set constant. More particularly, if adjustment is applied to $\sqrt{A}$ of the rod lens, the angle of the emitted light from the rod lens can be adjusted even though the core interval (2d) in the optical fiber pigtail is still fixed as it is (the incident position of the incident light is not changed), and therefore the angle of the incident light incident on the optical filter can be adjusted. If the rod lens having the large $\sqrt{A}$ is employed, the propagated light is bent sharply and thus the larger angle of the incident light can be derived. Accordingly, the selected wavelength is shifted to the shorter wavelength side.

Upon manufacturing the optical coupler that is assembled by tuning/fixing optically a subassembly in which an optical filter chip is fixed near a lens end surface of a dual fiber collimator, which consists of a dual (or more) optical fiber pigtail and a graded index rod lens, and a single fiber collimator consisting of a single (or more) optical fiber pigtail and a rod lens, the center wavelength in the bandwidth of the transmitted light or the reflected light of the optical filter is tuned arbitrarily while exchanging the rod lens having the different refractive index distribution constant ($\sqrt{A}$).

In particular, if the rod lens having a 0.25 pitch is employed, the optical fiber pigtail and the optical fiber can be adhered/fixed onto respective lens surfaces. Adjustments of the composition of the glass base material, the diameter of the glass base material, ion exchange conditions, etc. make it possible to adjust the refractive index profile of the graded index rod lens successively, precisely and easily.

Also, in the rod lens in which the optical filter is formed directly on the lens end surface, the refractive index distribution constant can be readjusted by annealing the lens in the temperature range in which an ion mobility is increased.

EXAMPLES

A method of constructing the wavelength division multiplexing optical coupler while applying the wavelength tuning will be explained in detail with reference to the drawings hereinafter. In Figures, the same members are indicated by affixing the same reference numerals to them.

A first example is a wavelength division multiplexing optical coupler whose target center wavelength in the selected wavelength bandwidth is set to 1550.12 nm.

Figure 3A:
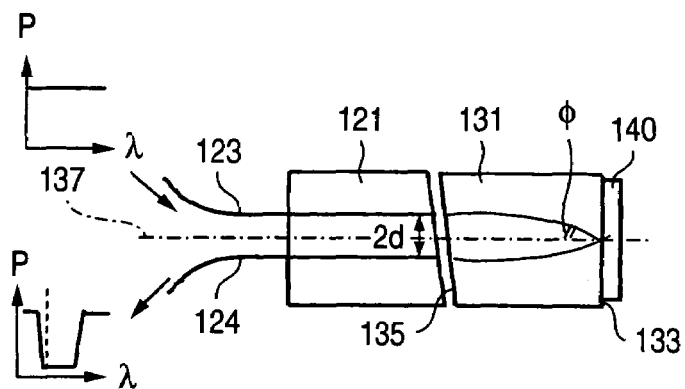

The dielectric multilayer BPF whose pass bandwidth is designed to 0.3 nm was formed on a glass substrate. As shown in FIG. 3A, this BPF chip 140 was bonded/fixed onto an emitted side end surface (second end surface) 133 of a graded index rod lens (first graded index rod lens) 131, a refractive index distribution constant ($\sqrt{A}$) of which is 0.326 $mm^{-1}$ and a lens length of which is a 0.25 pitch, by using a jig.

It is desired that, in order to prevent the incident light from returning to the optical fiber, an incident side end surface (first end surface) 135 of the rod lens 131 should be formed to incline against a center axis 137 of the rod lens 131. A dual optical fiber pigtail 121 was arranged to face to this end surface 135, and a position of this pigtail was adjusted. In this case, two optical fibers 123, 124 were composed of a normal single-mode optical fiber having a cladding diameter of 125 μm respectively, and the core interval was set to 125 μm by adhering closely two optical fibers.

In the core tuning operation, a laser beam having a wavelength, which is in a wavelength 1.55 μm band and is out of the pass wavelength of the optical filter 140, was input from one optical fiber (first optical fiber) 123. This light was reflected by the optical filter 140, then passed through the rod lens 131, and then emitted from the end surface 135. Positions of the rod lens 131 and the optical fiber pigtail 121 were relatively moved and adjusted such that a quantity of light obtained when this light is coupled to the optical fiber (second optical fiber) 124 is maximized.

Figure 3B:
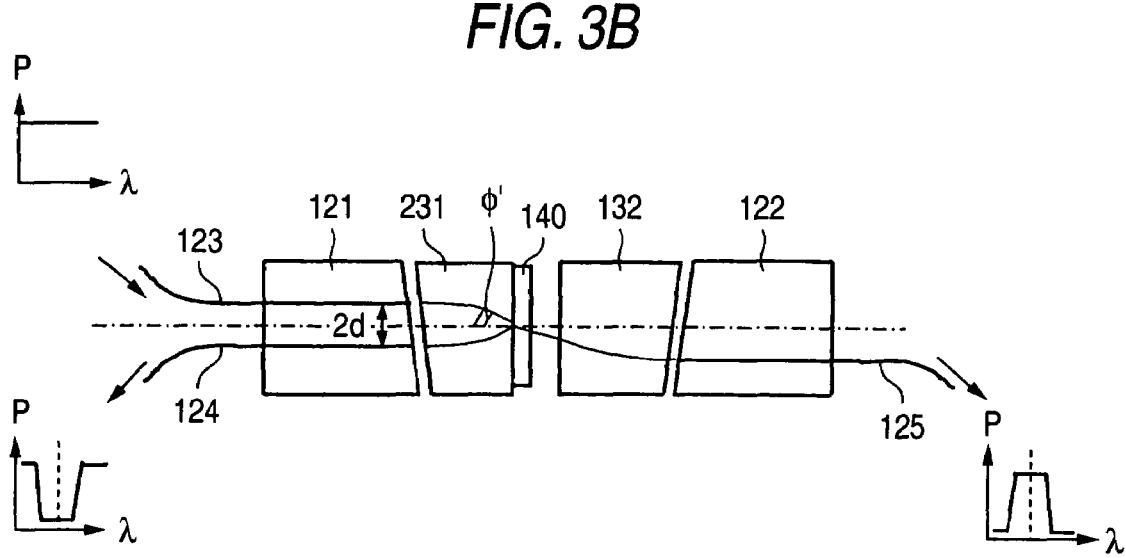

After the core tuning was completed, the wavelength of the laser beam was swept over 5 nm and the pass wavelength spectrum was measured. As a result, the measured center wavelength was 1550.44 nm in contrast to the target center wavelength of 1550.12 nm. Therefore, as shown in FIG. 3B, when the rod lens 131 was replaced with another graded index rod lens 231 having $\sqrt{A}=0.418$ mm$^{-1}$ and then their positions were retuned, the spectrum having the center wavelength of 1550.09 nm was obtained. Then, a dual collimator was completed by adhering/fixing the rod lens 231 and the dual optical fiber pigtail 121 with the epoxy resin.

Since $\sqrt{A}$ of the rod lens was adjusted to increase by about 28%, the wavelength tuning for shifting the center wavelength of the filter toward the shorter wavelength side by 0.35 nm could be implemented. Assume that the wavelength tuning generated per 1% of $\sqrt{A}$ change is defined as a tuning factor, the tuning factor at this time corresponds to −0.0125 nm/%.

After the dual collimator with the optical fiber was completed, positions of a single optical fiber pigtail 122 and a graded index rod lens (second graded index rod lens) 132 constituting a single optical fiber collimator were adjusted in such a way that a quantity of light of the light that is passed through the optical filter 140 and then coupled to the single optical fiber collimator is maximized. Then, the pigtail 122 and the rod lens 132 were adhered/fixed with the epoxy resin. As a result, a 3-port optical coupler was completed.

When a spectrum of the light that is passed through the optical filter 140 and then coupled to an optical fiber (third optical fiber) 125 was measured, the pass wavelength band and the stop wavelength band were just reversed from those of the previously-measured reflected light of the optical fiber, nevertheless the center wavelength coincided precisely with that of the reflected light at 1550.09 nm.

In the above example, the optical filter fabricated on the glass substrate was employed. But the film of the optical filter can be formed directly on the end surface of the graded index rod lens. Normally, such direct film formation onto the end surface of the rod lens can be applied to a number of lenses at a time. Therefore, the dielectric multi-layered film having the same film arrangement can be simultaneously formed on a wide variety of lenses each having the different $\sqrt{A}$.

Next, a second example having the similar characteristic to the above first example will be explained hereunder.

Figure 4A:
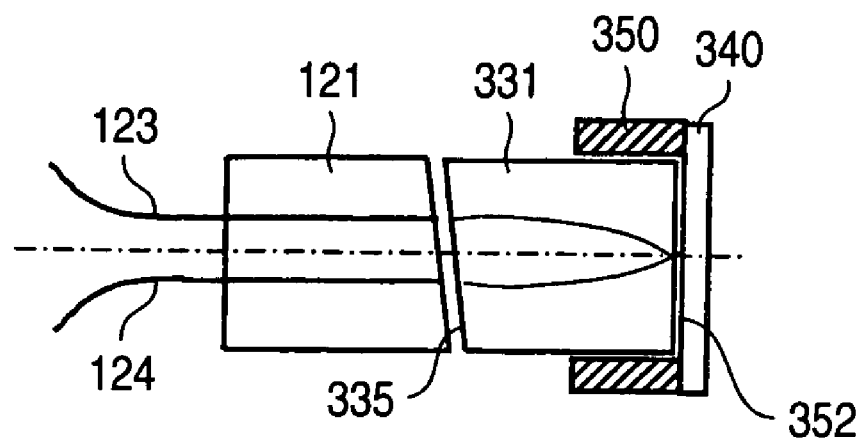
FIGS. 4A and 4B is views showing another example of the wavelength division multiplexing optical coupler of the present invention.
Figure 4B:
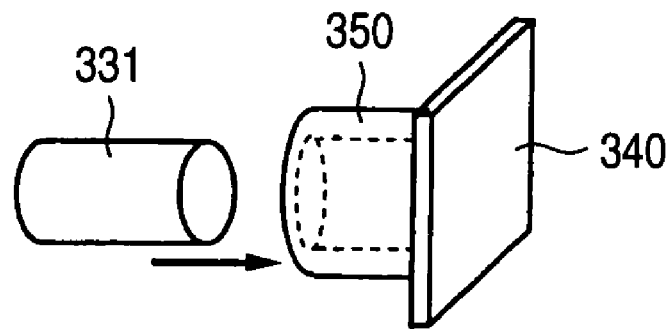

As shown in FIG. 4, a BPF chip (optical filter) 340 having an outer dimension of 1.8 mm square and a pass bandwidth of 0.32 nm was adhered onto one end surface 352 of a glass tube (cylindrical member) 350 having an inner diameter of 1.81 mm, an outer diameter of 2.6 mm and a length of 2 mm. Then, a graded index rod lens (first graded index rod lens) 331 having an outer diameter of 1.80 mm and $\sqrt{A}=0.326$ mm$^{-1}$ was inserted securely into the glass tube 350 so as to contact the BPF chip 340. Then, like the first example, the dual optical fiber pigtail 121 having the core interval of 125 μm was faced to an end surface (first end surface) 335 of the rod lens 331, which was directed to the opposite side to an end surface 333 that contacts the BPF chip 340. Then, the position of the optical fiber pigtail 121 was adjusted with respect to the rod lens 331.

In contrast to the target center wavelength of 1550.12 nm, the actual value measured based on a spectrum of the reflected light from the optical filter 340 was 1549.98 nm.

Therefore, when the rod lens 331 was replaced with a rod lens having $\sqrt{A}=0.302$ mm$^{-1}$ and then their positions were retuned, a spectrum having the center wavelength of 1550.07 nm was obtained at this time.

This operation merely yielded the insufficient adjustment yet. Hence, when this rod lens was pulled out from the glass tube 350, then another rod lens 331 having $\sqrt{A}=0.289$ mm$^{-1}$ was inserted to contact tightly, and then the position of the optical fiber pigtail 121 was retuned, the center wavelength of 1550.12 nm was obtained and coincided perfectly with the target value. Then, the glass tube 350 and the rod lens 331, and the end surface 335 that is on the opposite side to the optical filter 340 and the dual optical fiber pigtail 121 were fixed with the epoxy adhesives respectively, whereby a dual fiber collimator with the optical filter was completed. Since the single fiber collimator for receiving the transmitted light from the optical filter is similar to that in the first example, its explanation and illustration will be omitted herein. In this example, the tuning factor was consistent with −0.0125 nm/%.

From only above two examples, it was verified that, if the refractive index distribution constant ($\sqrt{A}$) of the rod lens is changed from 0.289 to 0.418, for example, the center wavelength of BPF can be tuned by 0.46 nm.

In the above examples, the optical coupler for isolating the signal on one selected channel from the incident signals by tuning the center wavelength of BPF is explained. But the present invention can also be applied to other optical parts.

Also, there is the case where not the above selection of one channel but the selection of plural channels is required. In this case, the edge filter, i.e., SWPF or LWPF is employed. Because this wavelength edge must be adjusted with precision of several nm or less, the present invention can also be applied.

Further, in the optical add-drop module, or the like, for example, plural optical filters are employed and the optical fiber has three ports or more. Because the wavelength standard of the selected channel group is similar to the above, the present invention can also be applied in tuning these wavelength edges.

The described embodiments are directed to the optical wavelength division multiplexing optical couplers used in the wavelength division multiplexing optical communication where plural discrete wavelength optical signals are multiplexed. However, the invention is applicable to other wavelength selective optical devices.

For example, gains of an erbium-doped optical fiber (EDFA), which is generally used for amplifying attenuated propagated light in an optical fiber, have wavelength dependency. A gain flatten filter is used for flattening the gain change in the wavelength. It is necessary to adjust the wavelength dependency of the gain flatten filter for accomplishing accurate gain flattening. Thus, the invention is suitably applied to such the EDFA.

Input light to the rod lens is not limited to a light having discrete wave length in the invention. The invention is applicable for picking up a part of input light having continuous spectrum. For example, for picking up a narrower wavelength band from a broader wavelength band of light emitted from a super luminescent diode or the like. In this case, light emitted from the light source is directly incident on the graded index rod lens, and a light beam of reflected light or transmitted light by the filter is picked up. The invention is suitably applied for accurately selecting the wavelength of the light beam. Similarly, the invention is applicable in the case that a narrower wavelength band is picked up from an amplified spontaneous emission (ASE) light emitted from the EDFA.

The light beam is not always coupled to an optical fiber. The reflected light or the transmitted light by the optical filter may be input to a photodetector and converted to an electric signal.

For the optical filter of the invention, a multi-layered optical interference filter is used. A desired optical properties can be obtained by designing refractive index and film thickness of each layer constituted by dielectric material or the like, in other words, by designing the periodic structure of optical film thickness.

As representative examples, there are known a band pass filter having optical characteristics as shown in FIG. 1 that a predetermined wavelength band of light is passed and other wavelength of light is reflected, and an edge pass filter having optical characteristics that a wavelength range larger than (or smaller than) a predetermined wavelength is passed and the other range is reflected.

Further, by combining such an optical filter, it is possible to realize a gain flattening filter changing the transmitting rate dependent on the wavelength in which the gain of the optical fiber amplifier is flattened. In the invention, a reference wavelength related to the optical characteristics of various filters can be adjusted. For example, the representative wavelength is the center wavelength for the band pass filter, and is the wavelength at which the transmitting rate is 50% for the edge pass filter.

What is claimed is:

1. A wavelength selective optical device comprising:
    a replaceable first graded index rod lens or another graded index rod lens having a different $A^{1/2}$ than an $A^{1/2}$ of the replaceable first graded index rod lens, the lens having a first end surface thereof on which a divergent light is incident, and a second end surface thereof from which a parallel light beam is emitted; and
    an optical filter having a predetermined range of a pass bandwidth or a reflecting bandwidth arranged to face to the second end surface of the first graded index rod lens so that the parallel light beam emitted from the first graded index rod lens is incident on the optical filter;
    the replaceable first graded index rod lens being replaceably disposed contacting the optical filter wherein upon replacement by the another graded index rod lens an angle of the parallel light incident on the optical filter is adjusted by changing a refractive index distribution constant of the first graded index rod lens such that a wavelength range of the light which is reflected or transmitted by the optical filter is tuned within the predetermined range; and
    a tube through which the first rod lens can be pulled-out.

2. A wavelength selective optical device according to claim 1, wherein the optical filter is a multi-layered optical interference filter, and
    the refractive index distribution constant of the first graded index rod lens is adjusted such that a representative wavelength of the light reflected or transmitted by the optical filter is tuned within a desired range.

3. A wavelength selective optical device according to claim 1, wherein the optical filter is formed directly on the second end surface of the first graded index rod lens as a film.

4. A wavelength selective optical device, according to claim 1, further comprising a cylindrical member wherein the first graded index rod lens is inserted from one end portion of the cylindrical member so that the first graded index rod lens is fitted without clearance to the cylindrical member, and the optical filter is provided on another end portion of the cylindrical member.

5. A wavelength selective optical device according to claim 1, wherein the first graded index rod lens is selected from among a plurality of graded index rod lens groups having various different refractive index distribution constants.

6. A wavelength selective optical device comprising:
    a first optical fiber in which optical signals with a plurality of multiplexed wavelengths is propagated;
    a replaceable first graded index rod lens or another graded index rod lens having a different $A^{1/2}$ than an $A^{1/2}$ of the replaceable first graded index rod lens, the lens having a first end surface thereof on which a light emitted from an end surface of the first optical fiber is incident, and a second end surface thereof from which a parallel light beam is emitted;
    an optical filter having a predetermined range of a pass bandwidth or a reflecting bandwidth arranged to face to the second end surface of the first graded index rod lens so that the parallel light beam emitted from the first graded index rod lens is incident on the optical filter; and
    a second optical fiber arranged on a side of the first end surface of the first graded index rod lens to which a light reflected by the optical filter is coupled through the first graded index rod lens;
    the replaceable first graded index rod lens being replaceably disposed contacting the optical filter wherein upon replacement by another graded index rod lens an angle of the parallel light incident on the optical filter is adjusted by changing a refractive index distribution constant of the first graded index rod lens such that a wavelength range of the light reflected by the optical filter is tuned within the predetermined range; and
    a tube through which the first rod lens can be pulled-out.

7. A wavelength selective optical device according to claim 6, further comprising a second graded index rod lens having a first end surface thereof facing to the optical filter, and
    a third optical fiber arranged on a side of a second end surface of the second graded index rod lens to which a light transmitted from the optical filter is coupled through the second graded index rod lens.

8. A wavelength selective optical device according to claim 6, wherein the optical filter is a multi-layered optical interference filter, and
    the refractive index distribution constant of the first graded index rod lens is adjusted such that a representative wavelength of the light reflected by the optical filter is tuned within a desired range.

9. A wavelength selective optical device according to claim 6, wherein the optical filter is formed directly on the second end surface of the first graded index rod lens as a film.

10. A wavelength selective optical device, according to claim 6, further comprising a cylindrical member wherein the first graded index rod lens is inserted from one end portion of the cylindrical member so that the first graded index rod lens is fitted without clearance to the cylindrical member, and the optical filter is provided on another end portion of the cylindrical member.

11. A wavelength selective optical device according to claim 6, wherein the first graded index rod lens is selected among a plurality of graded index lens groups having various different refractive index distribution constants.

12. A wavelength selective optical device comprising:
a first optical fiber in which optical signals with a plurality of multiplexed wavelengths is propagated;
a replaceable first graded index rod lens or another graded index rod lens having a different $A^{1/2}$ than an $Av2$ of the replaceable first graded index rod lens, the lens having a first end surface thereof on which a light emitted from an end surface of the first optical fiber is incident, and a second end surface thereof from which a parallel light beam is emitted;
an optical filter arranged to face to the second end surface of the first graded index rod lens so that the parallel light beam emitted from the first graded index rod lens is incident on the optical filter;
a second graded index rod lens having a first end surface thereof facing to the first optical fiber; and
a second optical fiber arranged on the side of a second end surface of the second graded index rod lens to which a light transmitted from the optical filter is coupled through the second graded index rod lens,
the replaceable first graded index rod lens being replaceably disposed contacting the optical filter wherein upon replacement by another graded index rod lens an angle of the parallel light incident on the optical filter is adjusted by changing a refractive index distribution constant of the first graded index rod lens such that a wavelength range of the light transmitted from the optical filter is tuned within a desired range; and
a tube through which the first rod lens can be pulled-out.

13. A wavelength selective optical device according to claim 12, wherein the optical filter is a multi-layered optical interference filter, and
the refractive index distribution constant of the first graded index rod lens is adjusted such that a representative wavelength of the light transmitted from the optical filter is positioned within a desired range.

14. A wavelength selective optical device according to claim 12, wherein the optical filter is formed directly on the second end surface of the first graded index rod lens as a film.

15. A wavelength selective optical device according to claim 12, wherein the first graded index rod lens is selected among a plurality of graded index rod lens groups having various different refractive index distribution constants.

16. The device of claim 1, wherein whichever of the first rod lens or the another rod that the device comprises, such rod lens tightly contacts the optical filter.

17. The device of claim 1, comprising the first rod lens tightly contacting the optical filter and replaceable by the another rod lens having different $A^{1/2}$.

18. The device of claim 1, wherein the tube is a glass tube through which the first rod lens can be pulled out.

19. A wavelength selective optical device comprising:
a replaceable first graded index rod lens or another graded index rod lens having a different $Av2$ than an $Av2$ of the replaceable first graded index rod lens, the lens having a first end surface thereof on which a divergent light is incident, end a second end surface thereof from which a parallel light beam is emitted; and
an optical filter having a predetermined range of a pass bandwidth or a reflecting bandwidth arranged to face to the second end surface of the first graded index rod lens so that the parallel light beam emitted from the first graded index rod lens is incident on the optical filter;
the replaceable first graded index rod lens being replaceably disposed contacting the optical filter wherein upon replacement by the another graded index rod lens an angle of the parallel light incident on the optical filter is adjusted by changing a refractive index distribution constant of the first graded index rod lens such that a wavelength range of the light which is reflected or transmitted by the optical filter is tuned within the predetermined range; and
a tube through which the first rod lens can be pulled-out.

* * * * *